United States Patent [19]

Janssen

[11] Patent Number: 4,799,236
[45] Date of Patent: Jan. 17, 1989

[54] TELECOMMUNICATION SYSTEM COMPRISING A BUS CONDUCTOR AND TELECOMMUNICATION STATIONS CONNECTED TO THIS BUS CONDUCTOR THROUGH TRANSFORMERS

[75] Inventor: Daniël J. G. Janssen, Eindhoven, Netherlands

[73] Assignee: U.S. Philips Corp., New York, N.Y.

[21] Appl. No.: 53,987

[22] Filed: May 26, 1987

[30] Foreign Application Priority Data

Jun. 18, 1986 [NL] Netherlands .................. 8601572

[51] Int. Cl.$^4$ ............................................. H04B 3/02
[52] U.S. Cl. ................................. 375/36; 178/63 E; 307/260
[58] Field of Search .............. 375/36; 178/63 E, 64; 307/90, 260; 328/65, 59

[56] References Cited

U.S. PATENT DOCUMENTS 3,851,098 11/1974 Pingault ..................... 375/36

Primary Examiner—Robert L. Griffin
Assistant Examiner—Marianne Huseman
Attorney, Agent, or Firm—Thomas A. Briody; Leroy Eason

[57] ABSTRACT

A telecommunication system comprising a bus conductor to which respective stations are connected by respective transformers, communication taking place via voltage pulses $V_p$ on the bus. Each voltage pulse $V_p$ causes a magnetizing current $i_m$ to be developed in the spurious self-inductance of each connected transformer, which if not compensated will cause a faulty voltage to arise after termination of the pulse and so result in faulty information transfer. The invention provides a controllable voltage source which generates a compensating current $i_c$ in the winding of each connected transformer to compensate this faulty voltage, so that at the instants of pulse termination the total magnetization of all transformers remains unchanged.

4 Claims, 2 Drawing Sheets

TELECOMMUNICATION SYSTEM COMPRISING A BUS CONDUCTOR AND TELECOMMUNICATION STATIONS CONNECTED TO THIS BUS CONDUCTOR THROUGH TRANSFORMERS

BACKGROUND OF THE INVENTION

1. Field of the Invention

The invention relates to a telecommunication system, comprising a bus conductor and a plurality of telecommunication stations each connected via a transformer to the bus conductor, in which system communication takes place by means of a pulse signal containing successive voltage pulses of opposite polarity to be transferred via the bus conductor.

The invention likewise relates to a telecommunication station suitable for use in such a telecommunication system.

2. Description of the Related Art

Such a telecommunication system is known from the journal "Electronic Design" of July 26, 1984, pp. 171-178, more specifically the FIGS. 1 and 3.

In such a system the telecommunication stations comprise an information transmitter and an information receiver. When transmitting a binary signal the transmitter does so by sending in a time slot of a time frame a voltage pulse onto the bus conductor, representing a first bit type, or by not transmitting a pulse, representing a second bit type. The receivers of the telecommunication stations detect in each time slot the voltage condition of the bus conductor. A receiver detects a bit of the first type if the absolute value of the detected voltage exceeds the predetermined threshold value; the receiver detects a bit of the second bit type if the absolute value of the detected voltage is lower than the threshold value.

When using a telecommunication system of the aforementioned type faulty detection will occasionally take place. More specifically, voltage pulses can be detected in time slots in which no voltage pulses have been transmitted.

SUMMARY OF THE INVENTION

The invention has for its object to provide such a telecommunication system in which the number of erroneously detected pulses can be reduced.

To realize the aforementioned object the telecommunication system in accordance with the invention is characterized in that the system comprises compensating means for producing compensating current in at least one winding of at least one bus-connected transformer for keeping the algebraic sum of the magnetizations of the transformer cores substantially unchanged at the instants of pulse termination.

The invention is based on the inventive understanding that faulty detection of voltage pulses in time slots wherein no pulse has actually been transmitted is caused by the non-ideal behaviour of the transformers which are connected to the bus conductor. Since a non-ideal transformer has a non-infinite self-inductance which will henceforth be designated as spurious self-inductance, energy is stored during the voltage pulse as a consequence of the magnetizing current. After the voltage pulse has finished, this magnetizing current causes to arise across the bus impedance a faulty voltage whose polarity is opposite to that of the preceding voltage pulse. In succeeding time slots the bus-connected receivers detect this faulty voltage, which if of sufficient pulse height will erroneously be interpreted as a voltage pulse.

The compensating current can be produced in one or more arbitrary windings of the connected transformers. It is possible to connect for that purpose a separate transformer comprising compensating means, or to bring about this compensating current change in a winding of the transformer of the transmitting station.

An advantageous embodiment of the telecommunication system in accordance with the invention in which the total magnetization can be kept unchanged whilst neglecting the delays on the bus conductor, is characterized in that each telecommunication station of the system comprises an individual compensating current-source supplying a compensating current to a winding of the transformer of the relevant station, which compensating current changes at the pulse terminating instants keep the magnetization of the relevant transformer core substantially unchanged at these instants.

In this embodiment the faulty voltage is compensated for in each telecommunication station the moment when the voltage pulse is terminated at the relevant station.

A further embodiment of the telecommunication system in accordance with the invention, which allows for the change of the amplitude of the voltage pulse as a result of line attenuation and other influences during the change of compensating current, is characterized in that the compensating means comprise an integrating sample-and-hold circuit for establishing the pulse voltage on the bus conductor at the relevant station. The individual compensating current-source can be controlled via a control input connected to the integrating sample-and-hold circuit for bringing about a current change directly proportional to the pulse voltage.

The value of the magnetizing current as a result of the spurious self-inductance is equal to the product of the pulse height and the pulse duration divided by the value of the spurious self-inductance. The pulse duration and the spurious self-inductance being accurately known and constant, the value of the magnetizing current can be accurately determined by measuring the pulse height. If necessary, this value can be converted to that transformer winding in which the compensating current change is introduced. The latter quantity should then be equal to the converted magnetizing current.

BRIEF DESCRIPTION OF THE DRAWINGS

The invention and its advantages are described with reference to the following figures, with the same reference numerals indicating the same elements, in which.

DESCRIPTION OF THE PREFERRED EMBODIMENTS

Figure 1:
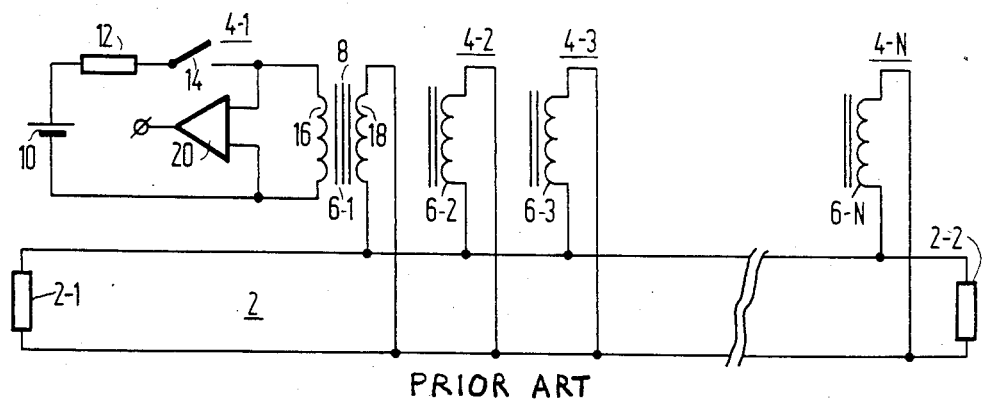
FIG. 1 shows a known telecommunication system comprising a bus to which a plurality of stations is connected.

FIG. 1 shows a telecommunication system known per se in which the invention can be implemented. This system comprises a two-wire bus, terminated on either end, by characteristic impedances 2-1 and 2-2. A plurality N of telecommunication stations (terminals) 4-1 to 4-N is connected to bus 2. Of these terminals only 4-1 is shown in a detailed diagram, the remaining terminals are shown symbolically by their spurious self-inductances 6-2 to 6-N. Also transformer 8 of terminal 4-1 shows a spurious self-inductance 6-1. Terminal 4-1 further comprises a pulse transmitter for transmitting pulse signals onto the bus. This transmitter is shown schematically as a source of constant voltage 10 having an internal resistor 12 connected to the circuitsided winding 16 of the transformer 8 via a pulse switch 14. Terminal 4-1 further comprises a receiver 20 for receiving pulse signals transmitted onto the bus. Despite the fact that in principle all terminals are capable of both transmitting and receiving, it will be assumed that terminal 4-1 is the transmitting terminal and the remaining terminals 4-2 to 4-N are the receiving terminals.

Figure 2:
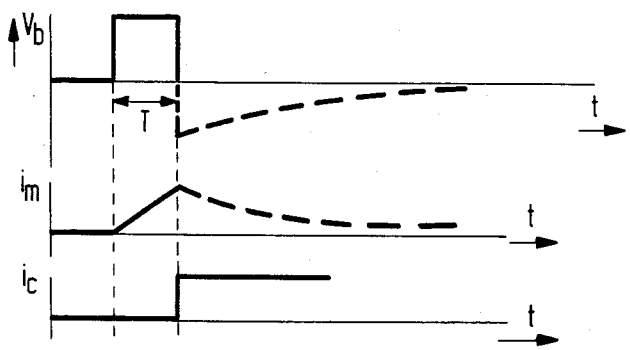
FIG. 2 shows a graphical representation of the pulse voltage on the bus conductor, the magnetizing current in a transformer and a compensating current.

FIG. 2 shows in the two upper graphs the course of the pulse voltage and the magnetizing current, the broken lines representing the course of these quantities which would occur if a compensating current were absent.

The top graph of FIG. 2 shows the course of the voltage on the bus if switch 14 is conductive for a pulse duration T. During the pulse in all spurious self-inductances 6-1 to 6-N a magnetizing current is generated whose final value per terminal is equal to the product of the pulse voltage V and the pulse duration T divided by the spurious selfinductance L. Thus the total magnetizing current in the system is N times as high.

At the final instant of a pulse on the bus this magnetizing current will cause a faulty voltage $V_f$ across the characteristic line impedance R of a value:

$$V_f = -\frac{NVTR}{L} \quad (1)$$

The minus sign in this formula indicates that the polarity of the faulty voltage is opposite to that of the pulse voltage. The faulty voltage curve then exponentially returns to zero having a time constant equal to R divided by L.

The middle graph of FIG. 2 shows the course of the magnetizing current in a spurious self-inductance resulting from a voltage pulse on the bus. The magnetizing current increases linearly during the pulse to the aforementioned terminal value; if there were no varying compensating current the magnetizing current after the pulse would exponentially decrease to zero having the afore-mentioned time constant.

The bottom graph of FIG. 2 shows the course of a possible compensating current. This current has zero value till the end of the pulse, after which this current is increased by an amount proportional to the decrease of the magnetizing current. If the magnetizing current has been calculated with the value of the spurious self-inductance as measured on the circuit-sided winding of the transformer and if the compensating current is conducted through this same winding, the change of compensating current will be equal to the maximum value of the magnetizing current. If the compensating current is conducted through another winding, the currents are in proportion to the ratio of the numbers of turns of these windings. If the change of compensating current had been brought about in the winding in which the magnetizing current occurs, there would not have been any faulty voltage in the course of the pulse voltage (top graph of FIG. 2).

Figure 3:
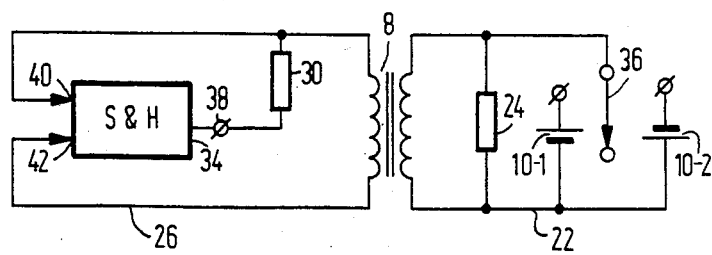
FIG. 3 shows two embodiments of the compensating arrangement in a station.

FIG. 3 shows an embodiment of a terminal comprising a compensating arrangement in accordance with the invention. The transmitting terminal together with the line load 24 has been represented by reference numeral 22. The transmitter has been represented symbolically as the composition of two d.c. voltage sources 10-1 and 10-2 and a pulse switch 36. Voltage sources 10-1 and 10-2 are identical and of opposite polarity, so that this terminal is designed for alternately transmitting a positive and a negative voltage pulse. Thereto switch 36 switches alternately one of the voltage sources 10-1 and 10-2 into operation dependent on the polarity of the preceding pulse. If no pulse needs to be transmitted switch 36 has assumed the neutral position. The voltage course of the pulses generated by the terminal 22 has for example a form as shown in the top graph of FIG. 5.

The voltage pulses generated by the transmitting terminal 22 are transferred to the receiving terminal 26 via the associated transformer 8. In this receiving terminal 26 a compensating current is supplied to the circuit-sided winding of transformer 8. This compensating current is to change to such an extent that the change of magnetizing current is consequently compensated for.

For this purpose terminal 26 comprises a controllable voltage source 34 providing an output voltage whose change (at the pulse-terminating instant) is directly proportional to the pulse voltage. Together with resistor 30, this voltage source serves as a source of a current to the receiving circuit winding of the transformer 8. At a right choice of resistor 30 the change of compensating current then equals the (dropping) magnetizing current, as a consequence of which the magnetization of the core of the transformer remains unchanged.

The controllable voltage source 34 is preferably designed as an integrating sample-and-hold circuit, whose inputs 40 and 42 are connected to the circuit-sided winding of the transformer 8. By this integrating sample-and-hold circuit 34 the pulse height of the pulses on the bus is measured. This circuit produces an output voltage whose change is proportional to the measured pulse height. As the magnetizing current to be compensated for is likewise proportional to the pulse height, by the choice of resistor 30 the change of compensating current can be chosen such that it equals the change of magnetizing current.

Figure 4:
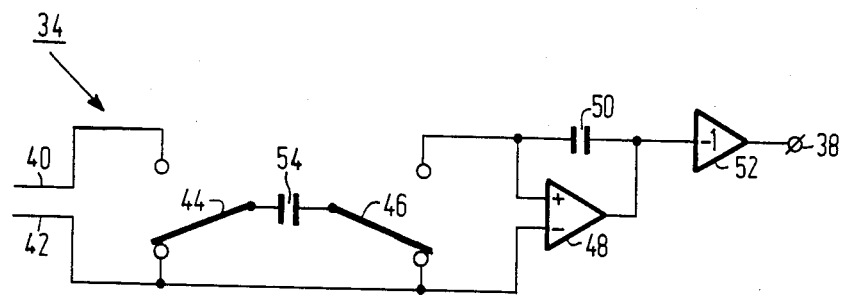
FIG. 4 shows an embodiment of an integrating sample-and-hold circuit, to be used as a voltage source for compensating current.

FIG. 4 shows an embodiment of the integrating sample-and-hold circuit 34. This circuit comprises two synchronously operated change-over switches 44 and 46 whose movable contacts are connected via a capacitor 54. The movable contact of change-over switch 44 moves between the two inputs 40 and 42, the contact of change-over switch 46 moving between a contact point connected to input 42 and a second contact point. The latter two contact points are connected to the inputs of an operational amplifier 48 whose output is fed back via a capacitor 50 to a non-inverting input, to which the second contact point has also been connected. Capacitor 50 has the same capacitance value as capacitor 54. To the output of amplifier 48 also an inverting amplifier 52 having an amplification factor equal to one has been connected. The output of amplifier 52 forms the ouput 38 of the entire circuit.

At the sampling instant the contacts of switches 44 and 46 are reversed from their sketched position, equally changing the load of the capacitors 54 and 50 As a fed back operational amplifier controls its two inputs to equal potential, the non-inverting input of amplifier 48 will assume zero potential so that the output of this amplifier assumes the negative sample voltage. Output 38 thus remains via amplifier 52 at the sampled voltage until the next samping instant. If amplifier 52 is designed to have a low output impedance, circuit 34 may serve as a voltage source for supplying the compensating current.

Figure 5:
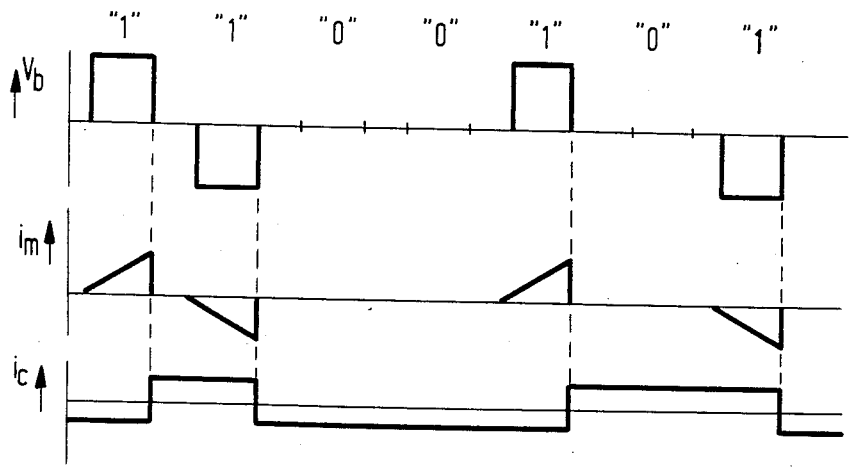
FIG. 5 shows a graphical representation of the course of the pulse voltage on the bus conductor, the associated course of the magnetizing current and the course of the associated compensating current as generated in one of the circuits in accordance with FIG. 3.

FIG. 5 shows a graphical representation of the pulse voltage $V_b$ on the bus, the associated magnetizing current $i_m$ in the spurious self-inductance, and the relevant course of the compensating current $i_c$. The course of the pulse current $V_b$ may have been caused by the terminal in which also the relevant magnetizing current is generated or by some other terminal. It is assumed that $V_b$ is the pulse voltage occurring on the circuit-sided winding of transformer 8, that $i_m$ is the magnetizing current in that same winding and that the compensating current is also led through this winding.

As hereinbefore described the rectangular voltage pulses cause a linearly increasing magnetizing current whose direction corresponds to the polarity of the (pulse) voltage. Both the size and the direction in which the magnetizing current will change at the pulse-terminating instant are therefore known. Since it is a known fact that the change of compensating current should be opposite to the magnetizing current at that same instant, the direction of the compensating current is also known. The size of this current is preferably chosen to be equal to half the magnetizing current so that at the end of the pulse only the direction of the compensating current is reversed. This process is repeated at each pulse-end so that the course as represented in figure 5 is thus developed.

It should be observed that it is not necessary for a proper functioning of the arrangement in accordance with the invention that the compensating current should be symmetrical with respect to zero current. The entire curve representing the current course $i_c$ may be shifted over an arbitrary vertical distance. This will only result in the maximum magnetic flux through the transformer core assuming a higher value. However, for the compensation of the faulty voltage only the change in the compensating current is of importance.

What is claimed is:

1. A telecommunication station for use in a telecommunication system comprising a plurality of such stations interconnected by a common bus conductor, each station including a coupling transformer having a plurality of windings at least one of which is coupled to the bus conductor; communication with any station being effected by transmission of a series of voltage pulses over the bus conductor which are received in the transformer winding coupled thereto and produce magnetizing current in such winding, such magnetizing current reaching a maximum value during each received voltage pulse and changing upon termination of such pulses as to generate a faulty voltage in such winding; such telecommunication station being characterized in that it comprises means connected to a winding of the coupling transformer thereof for generating a compensating current therein which changes upon termination of each received voltage pulse, such change corresponding to the maximum value of said magnetizing current and being in a direction opposite to the change in said magnetizing current upon termination of such voltage pulse; whereby the compensating current generates a voltage in the transformer winding coupled to said bus conductor substantially equal and opposite to the faulty voltage generated therein by the magnetizing current upon termination of a received voltage pulse.

2. A telecommunication station as claimed in claim 1, characterized in that the means for generating such compensating current comprises an integrating sample-and-hold circuit for storing each voltage pulse received from the bus conductor, and that such compensating current generating means is controllable by a control input thereof connected to the integrating sample-and-hold circuit for bringing about a change of the compensating current which is directly proportional to the received voltage pulse.

3. A telecommunication system as claimed in claim 1, characterized in that the voltage pulses on the bus conductor are of alternating polarity and that the compensating current changes in direction at the instants of termination of such pulses but remains unchanged in magnitude at these instants.

4. A telecommunication system as claimed in claim 1, characterized in that the compensating current is produced in a winding of said coupling transformer other than the winding thereof which is connected to the bus conductor.

* * * * *